United States Patent
Liu et al.

(10) Patent No.: US 12,080,030 B2
(45) Date of Patent: Sep. 3, 2024

(54) IMAGE PROCESSING METHOD AND DEVICE, CAMERA APPARATUS AND STORAGE MEDIUM

(71) Applicant: SHENZHEN SITAN TECHNOLOGY CO., LTD., Guangdong (CN)

(72) Inventors: Zhaojun Liu, Guangdong (CN); Hu Mengyuan Zhang, Guangdong (CN); Weijing Mo, Guangdong (CN)

(73) Assignee: SHENZHEN SITAN TECHNOLOGY CO., LTD., Shenzhen (CN)

( * ) Notice: Subject to any disclaimer, the term of this patent is extended or adjusted under 35 U.S.C. 154(b) by 313 days.

(21) Appl. No.: 17/595,374

(22) PCT Filed: Apr. 28, 2020

(86) PCT No.: PCT/CN2020/087531
§ 371 (c)(1),
(2) Date: Nov. 15, 2021

(87) PCT Pub. No.: WO2021/217428
PCT Pub. Date: Nov. 4, 2021

(65) Prior Publication Data
US 2022/0245862 A1    Aug. 4, 2022

(51) Int. Cl.
*G06T 7/90* (2017.01)
*G06T 5/50* (2006.01)
*H04N 9/64* (2023.01)

(52) U.S. Cl.
CPC ............... *G06T 7/90* (2017.01); *G06T 5/50* (2013.01); *H04N 9/64* (2013.01); *G06T 2207/20021* (2013.01); *G06T 2207/20216* (2013.01)

(58) Field of Classification Search
CPC ... G06T 7/90; G06T 5/50; G06T 2207/20021; G06T 2207/20216; H04N 9/64; H04N 9/67; H04N 1/6033; H04N 1/646
See application file for complete search history.

(56) References Cited

U.S. PATENT DOCUMENTS

2004/0208362 A1   10/2004   Suzuki
2006/0109221 A1    5/2006   Park
(Continued)

FOREIGN PATENT DOCUMENTS

CN    101064766 A    10/2007
CN    102907108 A    1/2013
(Continued)

OTHER PUBLICATIONS

Al-Tairi et al, Skin Segmentation Using YUV and RGB Color Spaces, 2014, J Inf Process Syst, 10(2): 283-299. (Year: 2014).*
(Continued)

*Primary Examiner* — Aaron W Carter
*Assistant Examiner* — Kathleen M Broughton

(57) ABSTRACT

An image processing method and device, a camera apparatus and a storage medium are provided. The image processing method includes: acquiring an initial image, and the initial image corresponds to an RGB data format; dividing the initial image into a plurality of image blocks; converting each image block in the plurality of image blocks from the RGB data format into a YUV data format, wherein Y is a luminance value, and U and V are chromatic value; inverting a luminance value Y of a target image block into a darkness value D, and the target image block is at least one of the plurality of image blocks; coding DUV data of the target image block and YUV data of a non-inverted image block so as to obtain target image data of the initial image.

20 Claims, 4 Drawing Sheets

(56) References Cited

U.S. PATENT DOCUMENTS

| | | | |
|---|---|---|---|
| 2007/0252850 A1* | 11/2007 | Fujiwara | H04N 19/60 |
| | | | 345/604 |
| 2009/0034872 A1 | 2/2009 | Chiang | |
| 2011/0050934 A1* | 3/2011 | Mitsunaga | H04N 1/6027 |
| | | | 348/222.1 |
| 2011/0135198 A1 | 6/2011 | Schuler | |
| 2013/0162765 A1* | 6/2013 | Cohen | H04N 13/261 |
| | | | 348/43 |
| 2016/0241885 A1* | 8/2016 | Ström | H04N 19/186 |
| 2017/0155905 A1* | 6/2017 | Puri | H04N 19/129 |
| 2017/0323617 A1* | 11/2017 | Yang | H04N 9/646 |
| 2019/0197341 A1* | 6/2019 | Doshi | H04N 9/8042 |

FOREIGN PATENT DOCUMENTS

| | | | |
|---|---|---|---|
| CN | 104885382 A | | 9/2015 |
| CN | 104915629 A | | 9/2015 |
| CN | 107360429 A | | 11/2017 |
| CN | 110136183 A | | 8/2019 |
| CN | 110462627 A | | 11/2019 |
| CN | 110910333 A | | 3/2020 |
| JP | 2013101419 A | * | 5/2013 |

OTHER PUBLICATIONS

PC Magazine, Definition of YUV/RGB conversion formulas, 2013, http://www.pcmag.com/encyclopedia/term/yuvrgb-conversion-formulas. (Year: 2013).*

* cited by examiner

IMAGE PROCESSING METHOD AND DEVICE, CAMERA APPARATUS AND STORAGE MEDIUM

CROSS-REFERENCE TO RELATED APPLICATION

The present application is a U.S. national stage of International Application No. PCT/CN2020/087531 filed on Apr. 28, 2020, the disclosure of which is incorporated herein in its entirety by reference.

TECHNICAL FIELD

Embodiments of the present application relate to the field of image processing technologies, for example, relate to an image processing method and device, a camera apparatus and a storage medium.

BACKGROUND

With the development of the 5th Generation Mobile Communication Technology (5G) and the high-definition video technology, the demand for high-definition display is also increasing.

A high-definition video is displayed in a manner that a video is divided into pictures frame by frame and each picture is transmitted to a display device, for example, a television for playing after Red Green Blue (RGB) data of the picture is converted into Luminance-Bandwidth-Chrominance (YUV) data, coded, compressed and decoded. The usually used display device works in a passive luminescent mode, so a coding method is set for the display device with the passive luminescent mode. For some display devices with active luminescent modes, the coding mode to the passive luminescent mode is also continued to use.

However, for the display devices with active luminescent modes, the coding mode to the passive luminescent mode is used continuously for coding each frame of image of the video, thereby causing great data size of image data obtained through coding.

SUMMARY

Embodiments of the present application relate to an image processing method and device, a camera apparatus and a storage medium so as to realize reduction of data size of image data obtained through coding.

Embodiments of the present application provide an image processing method, the method comprises:
  acquiring an initial image, wherein the initial image corresponds to an RGB data format;
  dividing the initial image into a plurality of image blocks;
  converting each image block in the plurality of image blocks from the RGB data format into a YUV data format, wherein Y is a luminance value, and U and V are chromatic value;
  inverting a luminance value Y of a target image block into a darkness value D, and the target image block is at least one of the plurality of image blocks;
  coding DUV data of the target image block and YUV data of the non-inverted image block so as to obtain target image data of the initial image.

Embodiments of the present application provide an image processing device, the device comprises:

an image acquisition module, which is configured to acquire an initial image, wherein the initial image corresponds to an RGB data format;
a division module, which is configured to divide the initial image into a plurality of image blocks;
a data conversion module, which is configured to convert each image block in the plurality of image block from the RGB data format into YUV data format, wherein Y is a luminance value, and U and V are chromatic value;
the data conversion module is also configured to invert a luminance value Y of a target image block into a darkness value D, and the target image block is at least one of the plurality of image blocks; and
a coding module, which is configured to code DUV data of the target image block and YUV data of a non-inverted image block so as to obtain target image data of the initial image.

Embodiments of the present application provide a camera apparatus, the camera apparatus comprises:
  one or a plurality of processors;
  a storage device, which is configured to store one or a plurality of programs;
  One or the plurality of programs is executed through one or the plurality of processors, so that one or the plurality of processors implement the image processing method of any embodiment of this application.

Embodiments of the present application provide a computer-readable storage medium, wherein the computer-readable storage medium stores a computer program, and while the program is executed by the processor, the image processing method of any embodiment of this application is implemented.

DETAILED DESCRIPTION OF THE EMBODIMENTS

Figure 1:
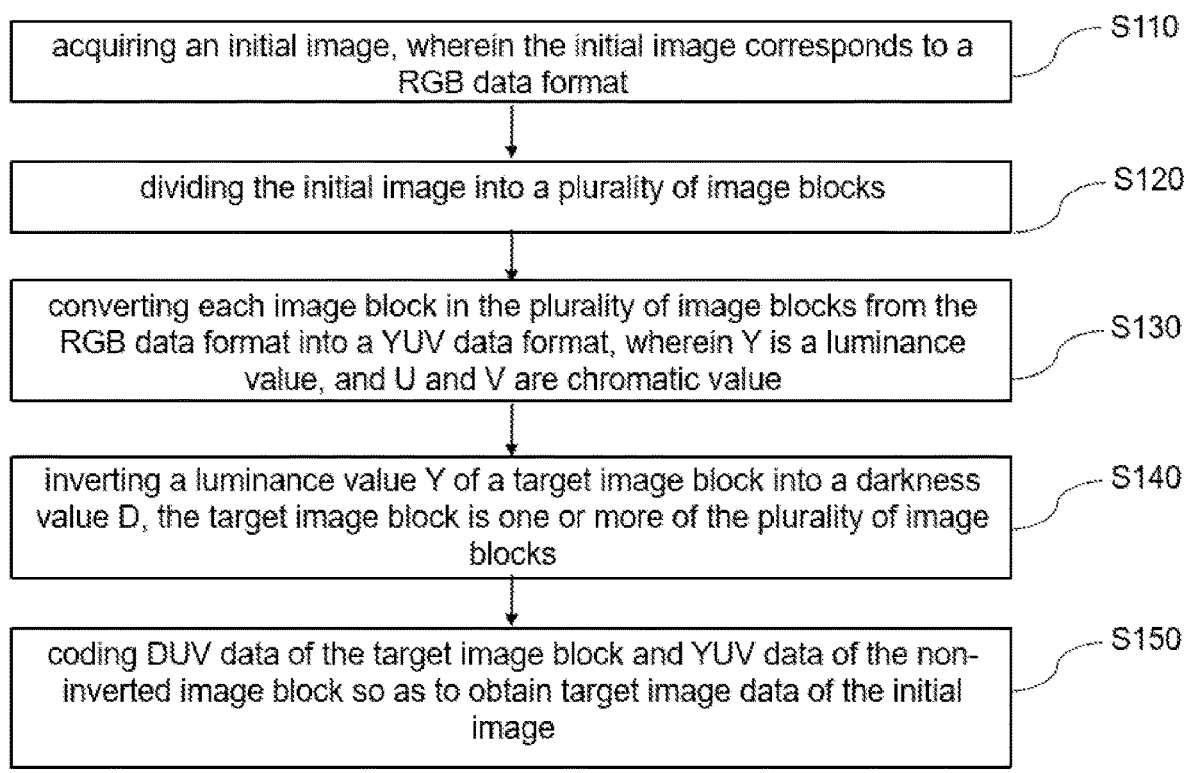
FIG. 1 is a flow schematic diagram of an image processing method according to an embodiment I of this application.

This application is described below in combination with drawings and embodiments. Drawings only shows structures related to this application rather than all structures.

Some exemplary embodiments are described to become the processing or method described as flow chart. Although the flow chart describes a plurality of steps to an order processing, many steps in the plurality of steps may be implemented in parallel, concomitantly or at the same time. In addition, the order of the plurality of steps may be rearranged. When the operation is completed, the processing may be terminated, however there may be additional steps not included in the drawings. The processing may correspond to a method, a function, a regulation, a subroutine, a subprogram, etc.

In addition, terms "first", "second" and the like may be used for describing a plurality of directions, actions, steps or elements and the like in this application. However, these directions, actions, steps or elements are not limited by these terms. These terms are only used for distinguishing a first direction, action, step or element from another direction, action, step or element. For example, a first target pixel may be called as a second target pixel without deviating from the scope of this application, and similarly, the second target pixel may be called as the first target pixel. The first target pixel and the second target pixel are both target pixels, however the first target pixel and the second target pixel are not the same target pixel. Terms "first", "second" and the like are not understood as indicating or implying relative importance or impliedly indicating the quantity of the showed technical features. Thus, the features defined with "first" and "second" may expressly or impliedly comprise one or more features. In the description of this application, "a plurality of" means at least two, for example, two, three and the like, unless specific limitation otherwise.

Embodiment I

FIG. 1 is a flow schematic diagram of an image processing method according to an embodiment I of this application and suitable for a scene for processing an image. The method may be implemented through an image processing device, and the device may be implemented by adopting a manner of software and/or hardware and integrated in a camera apparatus.

As shown in FIG. 1, the image processing method provided by the embodiment I of this application includes steps S110-S150.

S110: an initial image is acquired, and the initial image corresponds to an RGB data format.

In one embodiment, the initial image refers to an image that needs to be processed through coding. In one embodiment, the initial image may be each frame of image in a multi-frame images forming a video, for example, each frame of image of a high definition video may be used as the initial image of this embodiment. The initial image may also be a picture, for example, a landscape photo and the like, and no limitations are made herein. In this step, the initial image corresponds to the RGB data format, which refers to a data format under an RGB color mode. In one embodiment, any color light F may be formed by adding and mixing R, G and B colors with different components: F=r[R]+g[G]+b[B]. Herein, R, G and B are respectively coefficients of the three primary colors participating in mixing, and r, g and b respectively show a red light, a green light and a blue light. Optionally, a camera apparatus with an image pickup function, such as a video camera, may be used for acquiring the initial image. After color separation and correction, the RGB data format of each pixel in the initial image, namely, an RGB value of each pixel is obtained.

S120: the initial image is divided into a plurality of image blocks.

In this step, images in the different image blocks are not mutually overlapped. The plurality of image blocks refers to two or above two image blocks, and the quantity of the plurality of image blocks is not limited. Optionally, the size of images in the different image blocks may be the same or different, and no limitations are made herein. Optionally, the size of images in the plurality of image blocks is the same. For example, the initial image is 160*160, which is divided into 20*20 of 8*8 pixel blocks, each pixel block has 64 pixels, and each pixel is shown in an RGB mode.

S130: each image block in the plurality of image blocks is converted from RGB data format into YUV data format, wherein Y is a luminance value, and U and V are chromatic value.

In this step, each image block includes one or a plurality of pixels. The quantity of the pixels is determined according to a manner for dividing the image blocks, and this embodiment does not make any limitation.

In one optional embodiment, the image blocks include one or a plurality of pixels, and the RGB data format includes an R component, a G component and a B component, the YUV data format includes a Y component, a U component and a V component, and converting each image block in the plurality of image blocks from the RGB data format into the YUV data format comprises:

one or a plurality of pixels corresponding to each image block is determined; the Y component of each pixel is determined according to the R component, the G component and the B component of each pixel; a first target pixel in one or the plurality of pixels is determined; and the U component and/or the V component of the first target pixel are determined according to the R component, the G component and the B component of the first target pixel.

In this embodiment, the R component, the G component and the B component of each pixel may be obtained through the color separation and correction of the initial image. The Y component of each pixel is determined according to the R component, the G component and the B component of each pixel. Optionally, the Y component of each pixel may be obtained through calculating Y=(0.299R+0.587G+0.114B). The first target pixel refers to a pixel that needs to calculate the U component and/or the V component. In one embodiment, for different YUV data formats, the first target pixels are different. Taking the YUV420 format as an example, each pixel keeps one Y (luminance) component, and in a horizontal direction, not each row takes U and V components, instead one row takes the U component only, and a row closing to this row takes the V component only, and repeating like this (namely, 4:2:0, 4:0:2, 4:2:0, 4:0:2 . . . ). Optionally, the U component of the first target pixel may be obtained through calculating U=−0.147R−0.289G+0.436B, and the V component of the first target pixel may be obtained through calculating V=0.615R−0.515G−0.100B.

S140: the luminance value Y of the target image block is inverted into the darkness value D, and the target image block is one or more of the plurality of image blocks.

Herein, the target image block refers to one or more blocks that need to invert the luminance value Y into the darkness value D in the plurality of image blocks. Optionally, all image blocks in the plurality of image blocks may be used as the target image blocks of this embodiment, thereby inverting the luminance value Y into the darkness value D. A part of image blocks in the plurality of image blocks, for example, the image block with the block average luminance value greater than 128, may be used as the target image blocks of this embodiment, and no limitations are made herein.

Optionally, the luminance value Y of the target image block may be inverted into the darkness value D through a first preset formula, which is D=255−Y, herein, Y=(0.299R+0.587G+0.114B), and R, G and B are respectively coefficients of the three primary colors participating in mixing.

In one optional embodiment, inverting a luminance value Y of the target image block into the darkness value D comprises:

an average luminance value of each image block is obtained; the image block with the average luminance value greater than a first preset luminance threshold value is determined as the target image block; and the luminance value Y of each pixel corresponding to the target image block is inverted into the darkness value D.

In this embodiment, the average luminance value of this embodiment may be obtained through summing the luminance value Y of the pixels corresponding to each image block. Optionally, the first preset luminance threshold value is 128. In this embodiment, the luminance value Y of each pixel of the target image block is inverted into the darkness value D.

In one embodiment, the luminance value Y of the pixels of all image blocks is inverted into the darkness value D, which may reduce the data size. However, the luminance value Y of a part of the image blocks is inverted into the darkness valued D, the data size is increased. Therefore, the luminance value of the target image block with the average luminance value greater than the first preset luminance threshold value is reverted, and the luminance value of a non-target image block cannot be reverted, so the data size obtained through decoding is reduced.

In another optional embodiment, inverting a luminance value Y of the target image block into the darkness value D comprises:

the luminance value Y of each pixel corresponding to each image block is obtained; the pixel with the luminance value Y greater than a second preset luminance threshold value is determined as a second target pixel; and the luminance value Y of the second target pixel is inverted into the darkness value D.

In this embodiment, optionally, all image blocks are used as the target image blocks. The second target pixel refers to the pixel with the luminance value Y greater than the second preset luminance threshold value. Optionally, the second preset luminance threshold value is 128. In this embodiment, the luminance value Y of the second target pixels is inverted into the darkness value D, and the luminance value Y of the other non-second target pixels does not need to be inverted into the darkness value D, so the data size obtained through decoding is reduced.

S150: the DUV data of the target image block and the YUV data of the non-inverted image block are coded, so that the target image data of the initial image is obtained.

Herein, the target image data refers to data that is obtained through coding the DUV data of the target image block and the YUK data of the non-inverted image block in the initial image. Coding refers to an operation of compiling the DUV data and the YUK data into binary characters. The non-inverted image block(s) is(are) image block(s) except for the target image block(s) in the plurality of image blocks.

In this embodiment, since most of high-definition display devices adopt the active luminescent mode (dark background+ highlight pattern, namely, white character with black background) to display video pictures, a great area of display is the dark display. However, in the passive luminescent mode, the coding of the dark display is 1, and the coding of the bright display is 0, and in the active luminescent mode, the coding of the dark display is 0, and the coding of the bright display is 1. At this time, if the YUV data of all image blocks is coded according to the needs of the active luminescent mode, great data size obtained through coding is necessarily caused. However, through inverting the luminance value Y of the target image block into the darkness value D, this embodiment fits with the display device with the active luminescent mode for coding, thereby solving the problem of great data size of the image data obtained through coding, and also solving the problem of great data size of the image data obtained through coding for the display device with the active luminescent mode. In addition, the data size of the image data obtained through decoding is reduced, and transmission efficiency for transmitting to the display device to play is also improved.

In one optional embodiment, after coding DUV data of the target image block and the YUV data of the non-inverted image block so as to obtain the target image data of the initial image, the image processing method further comprises:

The target image data is transmitted to the display device so that the display device decodes the target image data of the initial image for playing.

In this embodiment, the display device may be a device with the active luminescent mode or a device compatible with the active luminescent mode and the passive luminescent mode. In one embodiment, when the luminance value Y of all pixels of the initial image are inverted into the darkness value D, the display device may be the device with the active luminescent mode, the coding of the dark display is 0, and the coding of the bright display is 1. When the luminance value Y of a part of pixels of the initial image are inverted into the darkness value D, the part of inverted pixels is displayed in the active luminescent mode, namely, the coding of the dark display is 0, and the coding of the bright display is 1; the remaining non-inverted pixels is displayed in the passive luminescent mode, namely the coding of the dark display is 1, and the coding of the bright display is 0. Decoding playing refers to an operation of playing and displaying after performing anti-coding on the target image data.

In one embodiment, when the initial image is a picture, the display device may perform decoding and playing on the initial image. When the initial image is each frame of image in the multi-frame images forming one video, each frame of the initial image is decoded and coded according to a timestamp, thereby implementing the complete playing of one video.

According to the technical solution of the embodiments of this application, the initial image is acquired and the initial image corresponds to the RGB data format; the initial image is divided into a plurality of image blocks; each image block in the plurality of image blocks is converted from the RGB data format into the YUV data format, herein Y is the luminance value, and U and V are chromatic value; the luminance value Y of the target image block is inverted into the darkness value D, and the target image block is one or more of the plurality of image blocks; the DUV data of the target image block and the YUV data of the non-inverted image block are coded so as to obtain the target image data of the initial image. The luminance value Y is inverted into the darkness value D so as to fit with the display device with the active luminescent mode for coding, thereby achieving a technical effect of reducing the data size of the image data obtained through coding.

Embodiment II

Figure 2:
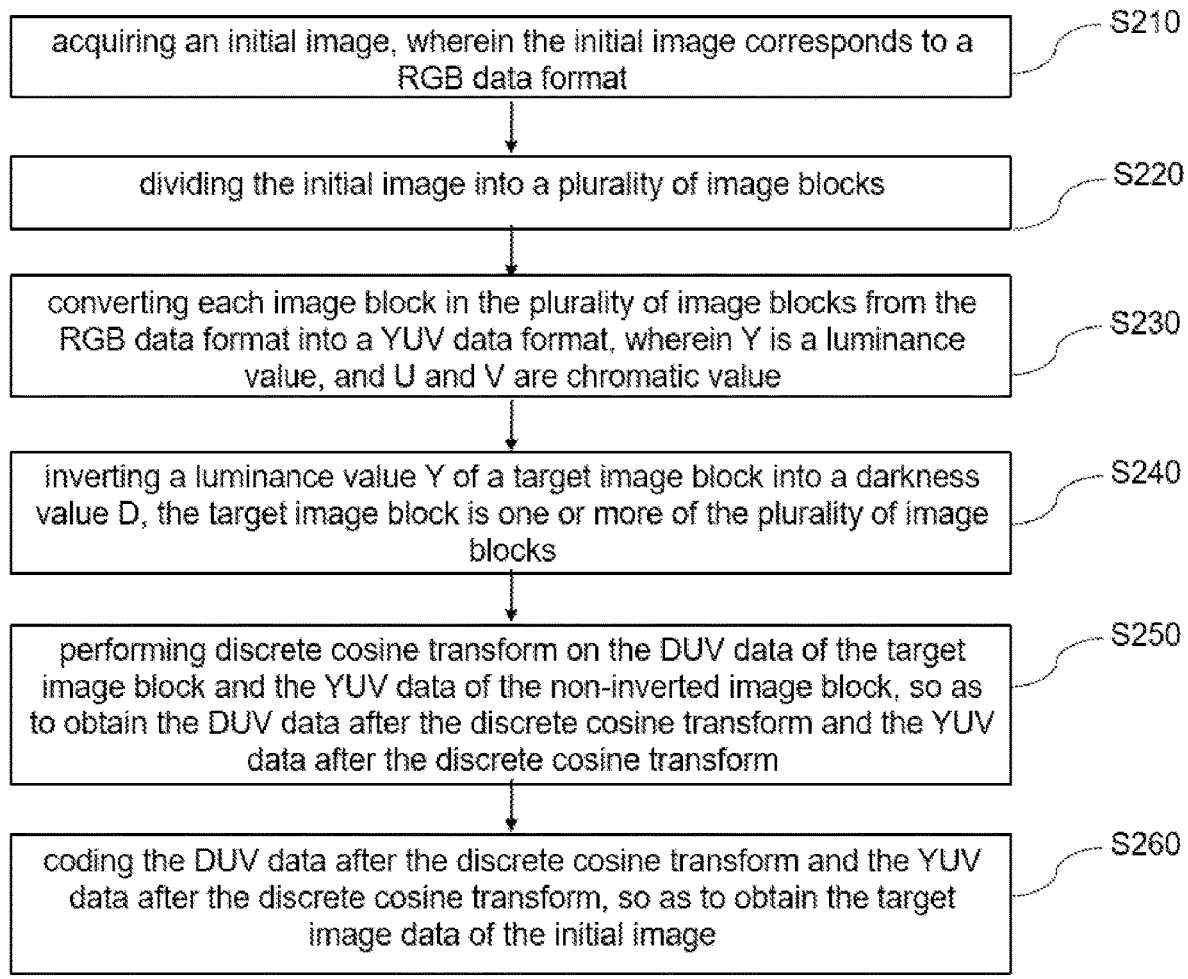
FIG. 2 is a flow schematic diagram of an image processing method according to an embodiment II of this application.

FIG. 2 is a flow schematic diagram of an image processing method according to an embodiment II of this application. Based on the above technical solution, this embodiment is applicable to a scene for processing the image. The method may be executed by an image processing device, and the device may be implemented by adopting a manner of software and/or hardware, and integrated in a camera apparatus.

As shown in FIG. 2, the image processing method provided by the embodiment II of this application includes steps S210-S260.

S210: an initial image is acquired, and the initial image corresponds to an RGB data format.

Herein, the initial image refers to an image that needs to be processed through coding.

S220: the initial image is divided into a plurality of image blocks.

In this step, images among the different image blocks are not mutually overlapped. The plurality of image blocks refers to two or above two image blocks, and the quantity of the plurality of image blocks is not limited.

S230: each image block in the plurality of image blocks is converted from the RGB data format into the YUV data format, Y is a luminance value, and U and V are chromatic value.

In this step, each image block includes one or a plurality of pixels. The quantity of the pixels is determined according to a manner for dividing the image blocks, and this embodiment does not make any limitation.

S240: the luminance value Y of the target image block is inverted into the darkness value D, and the target image block is one or more of the plurality of image blocks.

Herein, the target image block refers to one or more blocks that need to invert the luminance value Y into the darkness value D in the plurality of image blocks.

S250: the DUV data of the target image block and the YUV data of the non-inverted image block are performed discrete cosine transform, so that the DUV data after the discrete cosine transform and the YUV data after the discrete cosine transform are obtained.

In this step, the target image block and the non-inverted image block performed discrete cosine transform means that the image block is converted from a spatial domain into a frequency domain, that is to calculate which two-dimensional cosine waves forming the image. In one embodiment, the discrete cosine transform abandons a high frequency coefficient (Alternating Current (AC) coefficient) and keeps a low frequency information (Direct Current (DC) coefficient). The high frequency coefficient usually saves image boundaries and texture information, and the low frequency information is mainly the flat region information in the saved image.

S260: the DUV data after the discrete cosine transform and the YUV data after the discrete cosine transform are coded, so as to obtain the target image data of the initial image.

In this step, the DUV data after the discrete cosine transform and the YUV data after the discrete cosine transform are coded, so as to obtain the target image data of the initial image.

According to the technical solution of the embodiments of this application, the initial image is acquired and the initial image corresponds to the RGB data format; the initial image is divided into a plurality of image blocks; each image block in the plurality of image blocks is converted from the RGB data format into the YUV data format, herein Y is the luminance value, and U and V are chromatic value; the luminance value Y of the target image block is inverted into the darkness value D, and the target image block is one or more of the plurality of image blocks; the DUV data of the target image block and the YUV data of the non-inverted image block are coded so as to obtain the target image data of the initial image. The luminance value Y is inverted into the darkness value D so as to fit with the display device with the active luminescent mode for coding, thereby achieving a technical effect of reducing the data size of the image data obtained through coding.

Embodiment III

Figure 3:
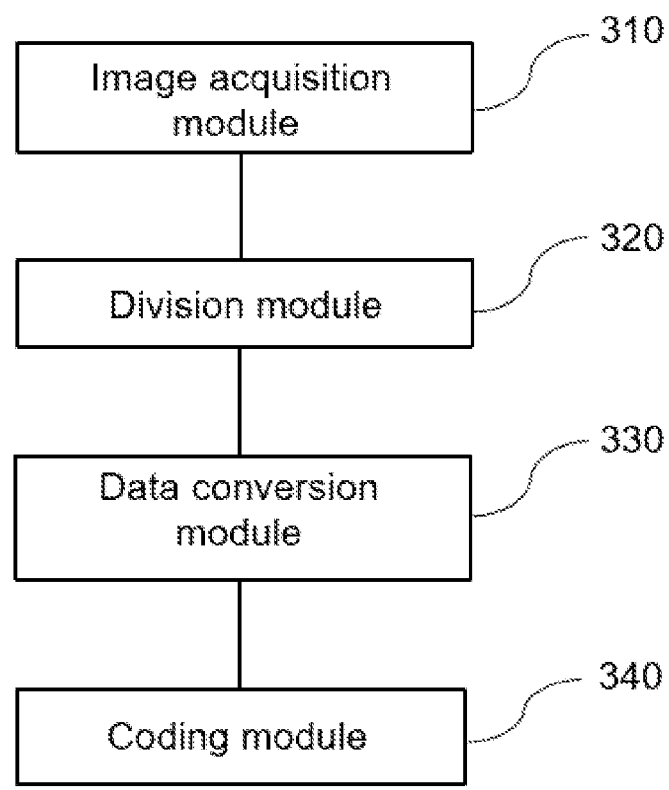
FIG. 3 is a structural schematic diagram of an image processing device according to an embodiment III of this application.

FIG. 3 is a structural schematic diagram of an image processing device according to an embodiment III of this application. This embodiment is applicable to a scene for processing the image. The device may be implemented by adopting a manner of software and/or hardware, and integrated in a camera apparatus.

As shown in FIG. 3, the image processing device provided by the embodiment may include an image acquisition module 310, a division module 320, a data conversion module 330 and a coding module 340.

The image acquisition module 310 is configured to acquire an initial image, and the initial image corresponds to an RGB data format.

The division module 320 is configured to divide the initial image into a plurality of image blocks.

The data conversion module 330 is configured to convert each image block in the plurality of image block from the RGB data format into YUV data format, Y is a luminance value, and U and V are chromatic value.

The data conversion module 330 is also configured to convert the luminance value Y of the target image block into the darkness value D, and the target image block is at least one or more of the plurality of image blocks.

The coding module 340 is configured to code DUV data of the target image block and YUV data of the non-inverted image block so as to obtain target image data of the initial image.

Optionally, the image block includes one or a plurality of pixels. The RGB data format includes an R component, a G component and a B component. The YUV data format includes a Y component, a U component and a V component. The data conversion module 330 includes a pixel determining unit, a Y-component determining unit, a first target pixel determining unit and an UV component determining unit.

The pixel determining unit is configured to determine one or more pixels corresponding to each image block.

The Y-component determining unit is configured to determine the Y component of each pixel according to the R component, the G component and the B component of each pixel.

The first target pixel determining unit is configured to determine a first target pixel in one or more pixels.

The UV component determining unit is configured to determine the U component and/or V component of the first target pixel according to the R component, the G component and the B component of the first target pixel.

Optionally, the data conversion module 330 is configured to invert the luminance Y of the target image block into the darkness value D through a first preset formula, and the first preset formula is:

D=255−Y, herein Y=(0.299R+0.587G+0.114B), R, G and B are respectively coefficients of the three primary colors participating in mixing.

Optionally, the data conversion module 330 further includes an average luminance value obtaining unit, a target image block determining unit and a first darkness value inverting unit.

The average luminance value obtaining unit is configured to obtain an average luminance value of each image block.

The target image block determining unit is configured to determine the image block with the average luminance value greater than the first preset luminance threshold value as the target image block.

The first darkness value inverting unit is configured to invert the luminance value Y of each pixel corresponding to the target image block into the darkness value D.

Optionally, the data conversion module 330 further includes a luminance value Y obtaining unit, a second target pixel determining unit and a second darkness value inverting unit.

The luminance value Y obtaining unit is configured to obtain the luminance value Y of each pixel corresponding to each image block.

The second target pixel determining unit is configured to determine the pixel with the luminance value Y greater than a second preset luminance threshold value as a second target pixel.

The second darkness value inverting unit is configured to invert the luminance value Y of the second target pixel into the darkness value D.

Optionally, the coding module 340 includes a changing unit and a coding unit.

The changing unit is configured to perform discrete cosine transform on the DUV data of the target image block and the YUV data of the non-inverted image block, so as to obtain the DUV data after the discrete cosine transform and the YUV data after the discrete cosine transform.

The coding unit is configured to code the DUV data after the discrete cosine transform and the YUV data after the discrete cosine transform, so as to obtain the target image data of the initial image.

Optionally, the image processing device further includes a transmission module.

The transmission module is configured to transmit the target image data to the display device, so that the display device decodes the target image data of the initial image for playing.

The image processing device provided by the embodiments of this application may execute the image processing method provided by any embodiments of this application, and has the functional modules and beneficial effects corresponding to the executed method. Contents not described in the embodiments of this application may refer to the description of any method embodiment of this application.

Embodiment IV

Figure 4:
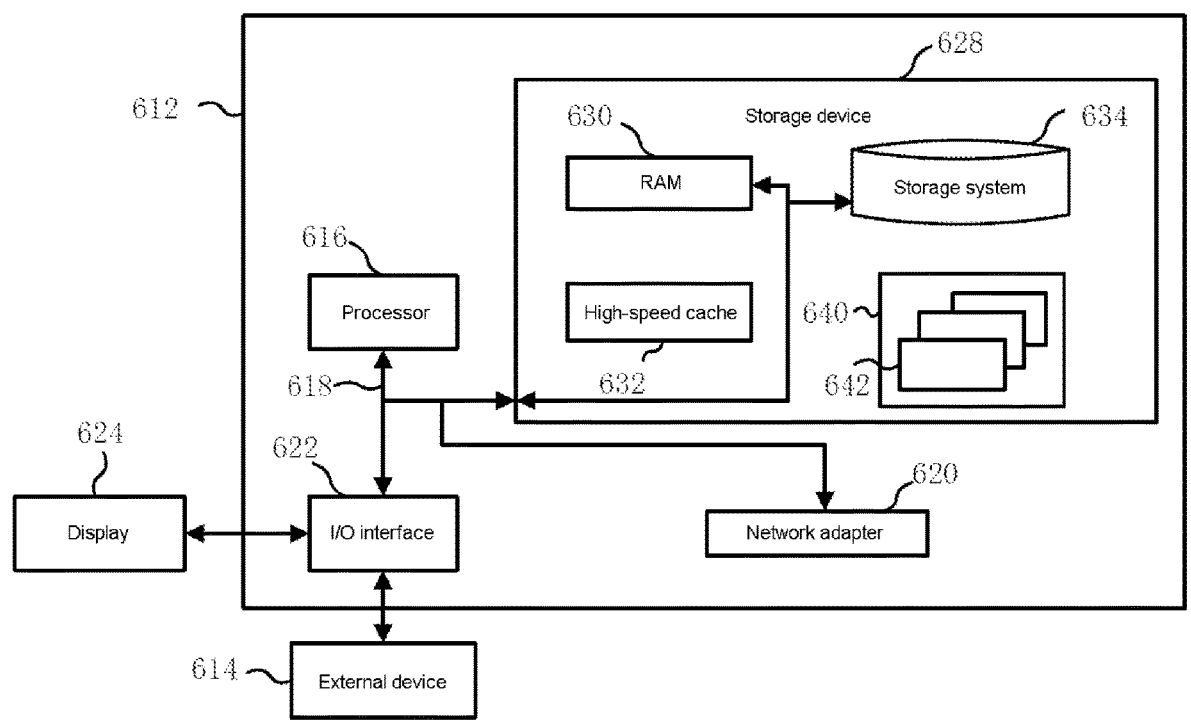
FIG. 4 is a structural schematic diagram of a camera apparatus according to an embodiment IV of this application.

FIG. 4 is a structural schematic diagram of a camera apparatus according to an embodiment IV of this application. FIG. 4 shows a block diagram of an exemplary camera apparatus 612 applicable to implement embodiments of this application. The camera apparatus 612 shown in FIG. 4 is only an example, which shall not bring any limitation to the function and using scope of the embodiments of this application.

As shown in FIG. 4, the camera apparatus 612 is expressed in a form of a general camera apparatus. The components of the camera apparatus 612 may include one or more processors 616, a storage device 628 and a bus 618 connecting different system components (including the storage device 628 and the processors 616).

The bus 618 shows one or more of several bus structures and includes a storage device bus or a storage device controller, a peripheral bus, a graphics acceleration port, a processor or a local area bus using any bus structure in the several bus structures. For example, these system structures include Industry Subversive Alliance (ISA) buses, Micro Channel Architecture (MAC) buses, enhanced ISA buses, Video Electronics Standards Association (VESA) local area buses and Peripheral Component Interconnect (PCI) buses.

The camera apparatus 612 includes a plurality of computer system readable mediums, which may be any usable medium capable of being accessed through the camera apparatus 612 and include volatile medium and non-volatile medium, movable and immovable medium.

The storage device 628 may include the computer system readable medium in a form of a volatile memory, for example, a Random Access Memory (RAM) 630 and/or a high-speed cache 632. A terminal 612 may include other movable/immovable, volatile/non-volatile computer system storage medium. Just as an example, the storage system 634 may be configured to read and write the immovable and non-volatile magnetic medium (not shown in FIG. 4, called as "hard disk drive"). Although not shown in FIG. 4, a disk drive capable of reading and writing a movable non-volatile disk (such as a floppy disk) and an optical disk drive capable of reading and writing a movable non-volatile optical disk, for example Compact Disc Read-Only Memory (CD-ROM), Digital Video Disc-Read Only Memory (DVD-ROM) and other optical medium may be provided. In these cases, each drive may be connected to the bus 618 through one or a plurality of data medium interfaces. The storage device 628 may include at least one program product, which has one group (for example, at least one) of program modules, and these program modules are configured to execute the functions of the plurality of embodiments of this application.

A program/utility tool 640 with one group (at least one) of the program modules 642 may for example be stored in the storage device 628, thus these program modules 642 include operation systems, one or more application programs, other program modules and program data, and each of these examples or each combinations of these examples may include implementation of a network environment. The program modules 642 usually execute the functions and/or methods in the embodiments described in this application.

The camera apparatus 612 may also communicate with one or a plurality of external devices 614 (for example, a keyboard, a pointing terminal, a display 624 and the like), or communicate with one or a plurality of terminals, through which a user may interact with the camera apparatus 612, and/or communicate with any terminal (for example, a network card, modulator-demodulator and the like), through which the camera apparatus 612 can communicate with one or a plurality of other computing terminals. Such communication may be performed through an Input/Output (I/O) interface 622. Moreover, the camera apparatus 612 may communicate with one or a plurality of networks (for example, a Local Area Network (LAN), a Wide Area Network (WAN) and/or a public network, such as Internet) through a network adapter 620. As shown in FIG. 4, the network adapter 620 communicates with other modules of the camera apparatus 612 through the bus 618. Although not shown in the figure, other hardware and/or software modules may be used in combination with the camera apparatus 612, including a microcode, a terminal drive, a redundant processor, an external disk drive array, a Redundant Arrays of Independent Disks (RAID) system, a tape drive and a data backup storage system, etc.

The processor 616 may execute a plurality of function applications and data processing through running the program stored in the storage device 628, for example, execute an image processing method provided by any embodiment of this application, the method may include:

the initial image is acquired, and the initial image corresponds to the RGB data format;

the initial image is divided into the plurality of image blocks;

each image block in the plurality of image blocks is converted from the RGB data format into the YUV data format, Y is a luminance value, and U and V are chromatic value;

the luminance value Y of the target image block is inverted into the darkness value D, and the target image block is one or more of the plurality of image blocks;

the DUV data of the target image block and the YUV data of the non-inverted image block are coded, so as to obtain the target image of the initial image.

According to the technical solution of the embodiments of this application, the initial image is acquired and the initial image corresponds to the RGB data format; the initial image is divided into the plurality of image blocks; each image block in the plurality of image blocks is converted from the RGB data format into the YUV data format, herein Y is the luminance value, and U and V are chromatic value; the luminance value Y of the target image block is inverted into the darkness value D, and the target image block is one or more of the plurality of image blocks; the DUV data of the target image block and the YUV data of the non-inverted image block are coded so as to obtain the target image data of the initial image. The luminance value Y is inverted into the darkness value D so as to fit with the display device with the active luminescent mode for coding, thereby achieving a technical effect of reducing the data size of the image data obtained through coding.

Embodiment V

The embodiment V of this application provides a computer-readable storage medium, the computer-readable storage medium stores a computer program, and while the computer program is executed by the processor, the image processing method of any embodiment of this application is implemented. The method may include:

the initial image is acquired, and the initial image corresponds to the RGB data format;

the initial image is divided into the plurality of image blocks;

each image block in the plurality of image blocks is converted from the RGB data format into the YUV data format, Y is a luminance value, and U and V are chromatic value;

the luminance value Y of the target image block is inverted into the darkness value D, and the target image block is one or more of the plurality of image blocks;

the DUV data of the target image block and the YUV data of the non-inverted image block are coded, so as to obtain the target image of the initial image.

The computer-readable storage medium provided by the embodiment of this application may adopt any combinations of one or a plurality of computer-readable mediums, which may be computer-readable signal medium or computer-readable storage medium. The computer-readable storage medium may be, for example, electricity, magnetism, light, electromagnetism, infrared ray, or a system, an apparatus or a device of a semiconductor or any combination of the above. The computer-readable storage medium includes an electric connection with one or a plurality of wires, a portable computer magnetic disk, a hard disk, a Random Access Memory (RAM), a Read-Only Memory (ROM), an Erasable Programmable Read-Only Memory (EPROM) or a flash memory, an optical fiber, a Compact Disc Read-Only Memory (CD-ROM), an optical storage device, a magnetic storage device, or any suitable combination of the above. In this application, the computer-readable storage medium may be any tangible medium including or storing a program, and the program may be used by a command execution system, apparatus or device or used in combination with the command execution system, apparatus or device.

The computer-readable signal medium may include a data signal that is transmitted in a base band or as a part of carrier wave, and a computer-readable program code is carried in the computer-readable signal medium. Such transmitted data signal may adopt a plurality of forms, including an electromagnetic signal, an optical signal or any suitable combination of the above. The computer-readable signal medium may also be any computer-readable medium except for the computer-readable storage medium. The computer-readable medium may send, spread or transmit a program used by the execution system, apparatus or device or used in combination with the execution system, apparatus or device.

The program code included in the storage medium may be transmitted through any suitable medium, which includes wireless, electric wire, an optical cable, Radio Frequency (RF) and the like or any suitable combination of the above.

A computer program code configured to execute the operation of this application may be compiled through one or a plurality of programming languages or their combination. The programming languages include an object-oriented programming language, such as Java, Smalltalk, C++, further include common procedural programming language, such as C language or similar programming language. The program code may be completely executed on a user computer, partially executed on the user computer, executed as an independent software package, partially executed on the user computer and partially executed on a remote computer, or completely executed on the remote computer or a terminal. In a case involving the remote computer, the remote computer may be connected to the user computer through any kind of network, including a Local Area Network (LAN) or a Wide Area Network (WAN), or connected to an external computer (for example, connected through the Internet by making use of an Internet service provider).

According to the technical solution of the embodiments of this application, the initial image is acquired and the initial image corresponds to the RGB data format; the initial image is divided into the plurality of image blocks; each image block in the plurality of image blocks is converted from the RGB data format into the YUV data format, herein Y is the luminance value, and U and V are chromatic value; the luminance value Y of the target image block is inverted into the darkness value D, and the target image block is one or more of the plurality of image blocks; the DUV data of the target image block and the YUV data of the non-inverted image block are coded so as to obtain the target image data of the initial image. The luminance value Y is inverted into the darkness value D so as to fit with the display device with the active luminescent mode for coding, thereby achieving a technical effect of reducing the data size of the image data obtained through coding.

What is claimed is:

1. An image processing method, comprising:

acquiring an initial image, wherein the initial image corresponds to an RGB data format;

dividing the initial image into a plurality of image blocks;

converting each image block in the plurality of image blocks from the RGB data format into a YUV data format that comprises a Y component, a U component, and a V component, wherein the Y component is a luminance value, the U component is a first chromatic value, and the V component is a second chromatic value;
   inverting the luminance value Y of a target image block into a darkness value D, the target image block being at least one of the plurality of image blocks; and
   coding DUV data of the target image block and YUV data of the non-inverted image block to obtain target image data of the initial image, which further comprises:
      performing discrete cosine transform on the DUV data of the target image block and the YUV data of the non-inverted image block to obtain transformed DUV data and transformed YUV data; and
      coding the transformed DUV data and the transformed YUV data to obtain the target image data of the initial image.

2. The method as claimed in claim 1, wherein each image block comprises at least one pixel, the RGB data format comprises an R component, a G component, and a B component, and converting each image block in the plurality of image blocks from the RGB data format into the YUV data format comprises:
   determining at least one pixel corresponding to each image block;
   determining the Y component of each pixel according to the R component, the G component, and the B component of each pixel;
   determining a first target pixel in the at least one pixel; and
   determining at least one of the U component and the V component of the first target pixel according to the R component, the G component, and the B component of the first target pixel.

3. The method as claimed in claim 2, wherein the R component, the G component, and the B component of each pixel are obtained through the color separation and correction of the initial image.

4. The method as claimed in claim 2, wherein the Y component of each pixel is obtained according to formula Y=(0.299R+0.587G+0.114B).

5. The method as claimed in claim 2, wherein the U component of the first target pixel is obtained according to formula U=−0.147R−0.289G+0.436B, and the V component of the first target pixel is obtained according to formula V=0.615R−0.515G−0.100B.

6. The method as claimed in claim 1, wherein inverting the luminance value Y of the target image block into a darkness value D comprises:
   inverting the luminance Y of the target image block into the darkness value D through a first preset formula, the first preset formula being D=255−Y,
   wherein Y=(0.299R+0.587G+0.114B), R, G and B are respectively coefficients of the three primary colors participating in mixing.

7. The method as claimed in claim 1, wherein inverting the luminance value Y of the target image block into the darkness value D comprises:
   obtaining an average luminance value of each image block;
   determining the image block with the average luminance value greater than a first preset luminance threshold value as the target image block; and
   inverting the luminance value Y of each pixel corresponding to the target image block into the darkness value D.

8. The method as claimed in claim 7, wherein the average luminance value is obtained by averaging all the luminance values Y of the pixels corresponding to each image block of the plurality of image block.

9. The method as claimed in claim 1, further comprising:
   transmitting the target image data to a display device, whereby the display device decodes the target image data of the initial image.

10. The method as claimed in claim 1, wherein the initial image is a frame of image in a multi-frame images forming a video or a picture.

11. An image processing method, comprising:
   acquiring an initial image, wherein the initial image corresponds to an RGB data format;
   dividing the initial image into a plurality of image blocks;
   converting each image block in the plurality of image blocks from the RGB data format into a YUV data format that comprises a Y component, a U component, and a V component, wherein the Y component is a luminance value, the U component is a first chromatic value, and the V component is a second chromatic value;
   inverting the luminance value Y of a target image block into a darkness value D, the target image block being at least one of the plurality of image blocks, which comprises:
      obtaining the luminance value Y of each pixel corresponding to each image block;
      determining the pixel with the luminance value Y greater than a second preset luminance threshold value as a second target pixel; and
      inverting the luminance value Y of the second target pixel into the darkness value D; and
   coding DUV data of the target image block and YUV data of the non-inverted image block to obtain target image data of the initial image.

12. The method as claimed in claim 11, wherein each image block comprises at least one pixel, the RGB data format comprises an R component, a G component, and a B component, and converting each image block in the plurality of image blocks from the RGB data format into the YUV data format comprises:
   determining at least one pixel corresponding to each image block;
   determining the Y component of each pixel according to the R component, the G component, and the B component of each pixel;
   determining a first target pixel in the at least one pixel; and
   determining at least one of the U component and the V component of the first target pixel according to the R component, the G component, and the B component of the first target pixel.

13. The method as claimed in claim 12, wherein the R component, the G component, and the B component of each pixel are obtained through the color separation and correction of the initial image.

14. The method as claimed in claim 12, wherein the Y component of each pixel is obtained according to formula Y=(0.299R+0.587G+0.114B).

15. The method as claimed in claim 12, wherein the U component of the first target pixel is obtained according to formula U=−0.147R−0.289G+0.436B, and the V component of the first target pixel is obtained according to formula V=0.615R−0.515G−0.100B.

16. The method as claimed in claim 11, wherein inverting the luminance value Y of the target image block into a darkness value D comprises:

inverting the luminance Y of the target image block into the darkness value D through a first preset formula, the first preset formula being D=255−Y,
wherein Y=(0.299R+0.587G+0.114B), R, G and B are respectively coefficients of the three primary colors participating in mixing.

17. The method as claimed in claim 11, wherein the initial image is each frame of image in a multi-frame images forming a video or a picture.

18. A camera apparatus, comprising:
at least one processor; and
a storage device that stores at least one program,
wherein the at least one program is executed through the at least one processor configured to implement an image processing method, the image processing method comprises:
acquiring an initial image, wherein the initial image corresponds to an RGB data format;
dividing the initial image into a plurality of image blocks;
converting each image block in the plurality of image blocks from the RGB data format into a YUV data format that comprises a Y component, a U component, and a V component, wherein the Y component is a luminance value, the U component is a first chromatic value, and the V component is a second chromatic value;
inverting the luminance value Y of a target image block into a darkness value D, the target image block being at least one of the plurality of image blocks; and
coding DUV data of the target image block and YUV data of the non-inverted image block to obtain target image data of the initial image, which further comprises:
performing discrete cosine transform on the DUV data of the target image block and the YUV data of the non-inverted image block to obtain transformed DUV data and transformed YUV data; and
coding the transformed DUV data and the transformed YUV data to obtain the target image data of the initial image.

19. The camera apparatus as claimed in claim 18, wherein inverting the luminance value Y of the target image block into the darkness value D comprises:
obtaining the luminance value Y of each pixel corresponding to each image block;
determining the pixel with the luminance value Y greater than a second preset luminance threshold value as a second target pixel; and
inverting the luminance value Y of the second target pixel into the darkness value D.

20. The camera apparatus as claimed in claim 18, wherein inverting the luminance value Y of the target image block into the darkness value D comprises:
obtaining an average luminance value of each image block;
determining the image block with the average luminance value greater than a first preset luminance threshold value as the target image block; and
inverting the luminance value Y of each pixel corresponding to the target image block into the darkness value D.

* * * * *